(12) United States Patent
Dubacher et al.

(10) Patent No.: US 11,541,855 B2
(45) Date of Patent: Jan. 3, 2023

(54) LOCKING DEVICE WITH A PULSE-CONTROLLED ROTARY LOCK

(71) Applicant: SAFRAN LANDING SYSTEMS, Velizy Villacoublay (FR)

(72) Inventors: Bertrand Dubacher, Moissy-Cramayel (FR); Marc Quernerch'Du, Moissy-Cramayel (FR); Bertrand Euzet, Moissy-Cramayel (FR)

(73) Assignee: SAFRAN LANDING SYSTEMS, Velizy Villacoublay (FR)

( * ) Notice: Subject to any disclaimer, the term of this patent is extended or adjusted under 35 U.S.C. 154(b) by 72 days.

(21) Appl. No.: 16/402,457

(22) Filed: May 3, 2019

(65) Prior Publication Data
US 2019/0337496 A1  Nov. 7, 2019

(30) Foreign Application Priority Data

May 4, 2018 (FR) ...................... 18 53897

(51) Int. Cl.
*B60T 8/17* (2006.01)
*B60T 8/32* (2006.01)
*B64C 25/34* (2006.01)

(52) U.S. Cl.
CPC ............ *B60T 8/1703* (2013.01); *B60T 8/325* (2013.01); *B64C 25/34* (2013.01)

(58) Field of Classification Search
CPC ....... B60T 8/1703; B60T 8/325; B64C 25/34; B64C 25/50; B64C 25/26; B64C 25/42;
(Continued)

(56) References Cited

U.S. PATENT DOCUMENTS 1,975,060 A * 9/1934 Flanders ................. F16H 63/18
74/334
3,069,078 A * 12/1962 Baird .................... B64C 25/426
235/60.13
(Continued)

FOREIGN PATENT DOCUMENTS

CA     2400984 C  *  3/2006  ............. F16D 65/14
CA     3042195 A1 * 11/2019 ............. F16D 11/16
(Continued)

OTHER PUBLICATIONS

French Preliminary Search Report of FR 18 53897 dated Jan. 7, 2019.

*Primary Examiner* — Behrang Badii
*Assistant Examiner* — Jalal C Coduroglu
(74) *Attorney, Agent, or Firm* — Sughrue Mion, PLLC

(57) ABSTRACT

The invention provides a locking device for preventing movement between two elements (11, 12) that are mounted to move relative to each other, the locking device including a lock (31) mounted to rotate relative to one of the elements in order to present successive angular positions for locking and for release in which the lock alternates between preventing and allowing relative movement between the two elements, the lock being constrained to rotate with a selector (55) of an angular indexing mechanism (50) actuated by a pulse-controlled actuator (70, 71) arranged to push the selector against a spring member (58) in order to cause it to turn on each pulse and thereby cause the lock to pass from one angular position to the other.

4 Claims, 6 Drawing Sheets

(58) Field of Classification Search
CPC .. F16D 23/12; F16D 2023/123; F16D 27/102; F16D 27/118; F16D 11/16; F16D 2011/006; F16D 2127/06; F16D 71/04; F16D 65/14; F16D 2121/20
See application file for complete search history.

(56) References Cited

U.S. PATENT DOCUMENTS

| | | | | |
|---|---|---|---|---|
| 3,264,818 A * | 8/1966 | Morrison | G04C 23/16 | 368/266 |
| 3,531,194 A * | 9/1970 | Alfred | G03B 9/10 | 352/216 |
| 3,881,783 A * | 5/1975 | Shiber | B60T 13/161 | 303/10 |
| 3,917,356 A * | 11/1975 | DeVlieg | B60T 8/1703 | 303/126 |
| 3,920,282 A * | 11/1975 | DeVlieg | B64C 25/426 | 303/113.5 |
| 3,926,479 A * | 12/1975 | Bissell | B60T 8/1703 | 303/122.04 |
| 3,937,526 A * | 2/1976 | Ruof | B60T 8/1703 | 303/155 |
| 4,007,970 A * | 2/1977 | Romero | B60T 7/12 | 303/126 |
| 4,367,529 A * | 1/1983 | Masclet | B60T 8/1703 | 303/126 |
| 5,024,491 A * | 6/1991 | Pease, Jr. | B60T 7/12 | 303/126 |
| 5,050,940 A * | 9/1991 | Bedford | B64C 25/42 | 303/166 |
| 5,180,214 A * | 1/1993 | Yeh | B60T 8/1703 | 701/71 |
| 5,333,816 A * | 8/1994 | Del Monte | B64C 25/50 | 244/50 |
| 5,397,173 A * | 3/1995 | Bourguet | B60T 8/1703 | 188/106 P |
| 5,845,538 A * | 12/1998 | Tornatore | A46B 15/0081 | 74/473.36 |
| 6,241,325 B1 * | 6/2001 | Gowan | B60T 8/1703 | 303/176 |
| 6,296,325 B1 * | 10/2001 | Corio | B60T 8/1703 | 244/110 A |
| 6,513,885 B1 * | 2/2003 | Salamat | B60T 8/1703 | 303/122.09 |
| 6,530,625 B2 * | 3/2003 | Arnold | B60T 8/00 | 303/126 |
| 6,672,688 B2 * | 1/2004 | Gale | B60T 8/1703 | 303/113.1 |
| 6,705,140 B1 * | 3/2004 | Dimig | E05B 81/06 | 292/201 |
| 6,744,162 B2 * | 6/2004 | Pierre | F16D 55/02 | 188/161 |
| 6,851,649 B1 * | 2/2005 | Radford | B60T 8/1703 | 188/264 R |
| 7,946,105 B2 * | 5/2011 | Bristol | F02K 1/766 | 244/11 OB |
| 8,109,465 B1 * | 2/2012 | Heer | B64C 25/26 | 244/102 R |
| 8,721,009 B1 * | 5/2014 | Roberts | B60T 8/1703 | 303/116.1 |
| 9,577,850 B2 * | 2/2017 | Ayichew | B64C 25/46 | |
| 9,914,531 B2 * | 3/2018 | Frank | B64C 25/34 | |
| 10,288,090 B2 * | 5/2019 | Kopecek | F15B 15/261 | |
| 2001/0045771 A1 * | 11/2001 | Corio | B60T 8/885 | 303/20 |
| 2002/0057012 A1 * | 5/2002 | Bourguet | B60T 8/1703 | 303/113.1 |
| 2002/0089188 A1 * | 7/2002 | Edgar | E05B 81/04 | 292/216 |
| 2003/0042802 A1 * | 3/2003 | Pierre | F16D 65/14 | 310/36 |
| 2005/0020402 A1 * | 1/2005 | Ny | G01R 31/2887 | 476/10 |
| 2005/0092045 A1 * | 5/2005 | Dimig | E05B 79/20 | 70/277 |
| 2005/0192733 A1 * | 9/2005 | Dellac | B60T 8/00 | 701/70 |
| 2005/0240321 A1 * | 10/2005 | Darke | B60T 8/1703 | 701/3 |
| 2006/0293805 A1 * | 12/2006 | Garcia | B60T 8/885 | 701/16 |
| 2009/0242696 A1 * | 10/2009 | Wilby | B64C 25/26 | 343/705 |
| 2015/0127195 A1 * | 5/2015 | Cahill | B64C 25/42 | 701/3 |
| 2015/0159679 A1 * | 6/2015 | Wamala | F04B 35/045 | 60/545 |
| 2017/0057624 A1 * | 3/2017 | Lo | B60T 8/1703 | |
| 2018/0015997 A1 * | 1/2018 | Zambrano | B64C 13/16 | |
| 2018/0079402 A1 * | 3/2018 | Bruggemann | B64C 25/426 | |
| 2018/0105259 A1 * | 4/2018 | Cahill | B60T 8/1703 | |
| 2019/0247050 A1 * | 8/2019 | Goldsmith | A61B 17/00491 | |
| 2019/0263506 A1 * | 8/2019 | Hubbard | B64C 25/42 | |

FOREIGN PATENT DOCUMENTS

| | | | | |
|---|---|---|---|---|
| DE | 4020654 C2 * | 12/1999 | | F02D 41/26 |
| DE | 19933499 A1 * | 1/2000 | | F16H 61/32 |
| DE | 102005016825 A1 * | 10/2006 | | B60R 22/343 |
| DE | 102005016826 A1 * | 10/2006 | | H01H 47/325 |
| DE | 19806579 B4 * | 11/2008 | | B21D 43/003 |
| DE | 102009027222 A1 * | 12/2010 | | F16H 59/0278 |
| DE | 102015204669 A1 * | 10/2015 | | F16H 63/36 |
| EP | 0 247 917 A1 | 12/1987 | | |
| EP | 0247917 A1 * | 12/1987 | | F16H 27/02 |
| EP | 0806591 A1 * | 11/1997 | | F16H 59/70 |
| EP | 0984186 A2 * | 3/2000 | | F16D 48/06 |
| EP | 0806591 B1 * | 8/2000 | | F16H 59/70 |
| EP | 0917632 B1 * | 12/2002 | | F16N 13/02 |
| EP | 3564118 A1 * | 11/2019 | | F16D 27/102 |
| FR | 2 829 206 A1 | 3/2003 | | |
| FR | 2829206 A1 * | 3/2003 | | F16D 55/02 |
| FR | 2 990 411 A1 | 11/2013 | | |
| FR | 2990411 A1 * | 11/2013 | | F16H 25/2015 |
| FR | 3080880 A1 * | 11/2019 | | F16D 23/12 |
| FR | 3080880 B1 * | 9/2020 | | B60T 8/325 |
| JP | 2010-135666 A | 6/2010 | | |
| JP | 2010135666 A * | 6/2010 | | A46B 15/0081 |
| SU | 957196 A1 * | 9/1982 | | F16D 65/14 |
| WO | WO-9917659 A1 * | 4/1999 | | A61B 6/14 |

* cited by examiner

LOCKING DEVICE WITH A PULSE-CONTROLLED ROTARY LOCK

The invention relates to a locking device with a pulse-controlled rotary lock for blocking two elements against moving relative to each other.

BACKGROUND OF THE INVENTION

In aviation, and in particular in the field of landing gear, numerous elements that can move relative to one another need to be capable of being locked in position. For example, it may be desired to lock the rod of an actuator to its cylinder in the extended position or in the retracted position, or indeed to lock a pinion mounted idle on a shaft in order to enable torque to be transmitted.

Document FR 2 952 414 proposes a catch locking device for locking a rod that is slidable in an actuator cylinder, in which a locking sleeve is rotatably mounted on the actuator cylinder in order to present a locking angular position that prevents the catches from moving apart, and an angular release position that allows the catches to move apart.

Proposals are also made in Document FR 2 829 206 to fit an aircraft wheel brake with a safety blocking device in the form of a friction brake having pulse-controlled actuator means serving to cause the safety blocking device to go from the locking state to the release state, which states are stable. The two states correspond to two stable axial positions of a selector forming part of a mechanism known as a "click-pen" mechanism, since it is commonly to be found in pens with a retractable tip. In one of the axial positions of the selector, the friction members of the blocking device are in contact and they therefore block the brake, and in the other one of the axial positions of the selector, the friction members of the blocking device are spaced apart and they therefore release the brake. Those stable axial positions correspond to successive angular positions of the selector, which is also movable in rotation as a result of co-operation between sloping cam surfaces, said selector being turned towards one or the other of those positions by the pulse actuation means that cause the selector to move axially against a spring member, the axial movement of the selector causing it to turn.

OBJECT OF THE INVENTION

The invention seeks to propose a pulse-controlled locking device for blocking to elements that are movable relative to each other, the device being very simple in structure.

SUMMARY OF THE INVENTION

In order to achieve this object, there is provided a locking device for preventing movement between two elements that are mounted to move relative to each other, the locking device including a lock mounted to rotate relative to one of the elements in order to present successive angular positions for locking and for release in which the lock alternates between preventing and allowing relative movement between the two elements, the lock being constrained to rotate with a selector of an angular indexing mechanism actuated by a pulse-controlled actuator that pushes the selector against a spring member in order to cause it to turn on each pulse and thereby cause the lock to pass from one angular position to the other.

Unlike the use that is made in Document FR 2 829 206, use is not made herein of the axial positions of the selector, but rather use is made of its angular positions, for causing the rotary lock of the device of the invention to turn. Turning the selector causes the lock to turn, which alternates between being in the locking position and being in the release position.

The pulse control need be no more than a single electromagnet, which is very reliable and simple to implement, its function being to move the selector axially against the spring member. Any kind of rotary connection may be provided between the lock and the selector, providing it leaves those two elements free to move axially relative to each other.

The device of the invention is particularly adapted to providing angular locking between two coaxial rotary elements such as a shaft (or spindle) and a pinion. In a particular embodiment of the invention at least one obstacle is provided on the shaft, being mounted to slide radially between a retracted position in which the pinion can turn freely on the shaft, and a projecting position in which the obstacle blocks the pinion on the shaft, the rotary lock comprising a bushing rotatably mounted coaxially inside the shaft in register with the obstacle and presenting successive angular positions comprising, in alternation, a release position in which the obstacle is received in a recess in the bushing in order to be retracted, and a locking position into which the obstacle is pushed by the bushing so as to be held in a projecting position.

Preferably, the bushing carries rollers that are arranged in the release position to leave sufficient space for the obstacle to enable it to be retracted between two rollers, and in the locking position to come directly in register with the obstacle so as to hold it in a projecting position.

The selector is then preferably rotatably mounted coaxially with the shaft, while being constrained to rotate with the bushing.

DESCRIPTION OF THE FIGURES

The invention can be better understood in the light of the following description of a particular embodiment of the invention, given with reference to the figures of the accompanying drawings, in which.

DETAILED DESCRIPTION OF THE INVENTION

With reference to the figures, the invention is illustrated herein in application to steering wheels carried by the steerable bottom portion of an undercarriage. Nevertheless, this application is not limiting, and other applications can be envisaged.

Figure 2:
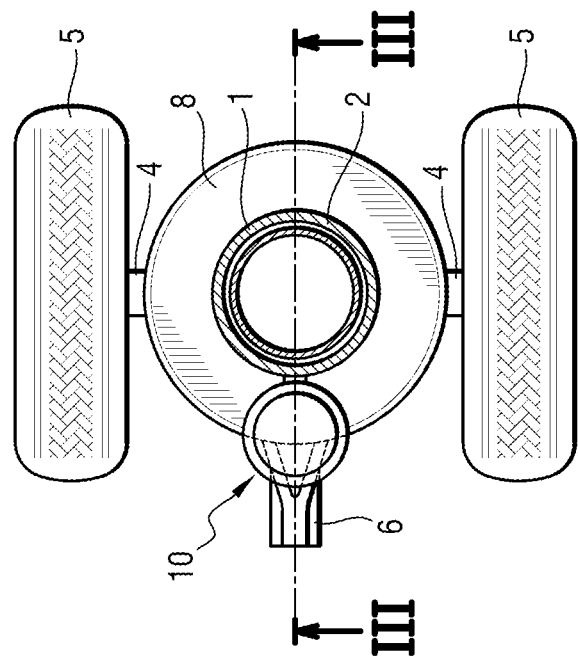
FIG. 2 is a plan view of the FIG. 1 undercarriage.
Figure 1:
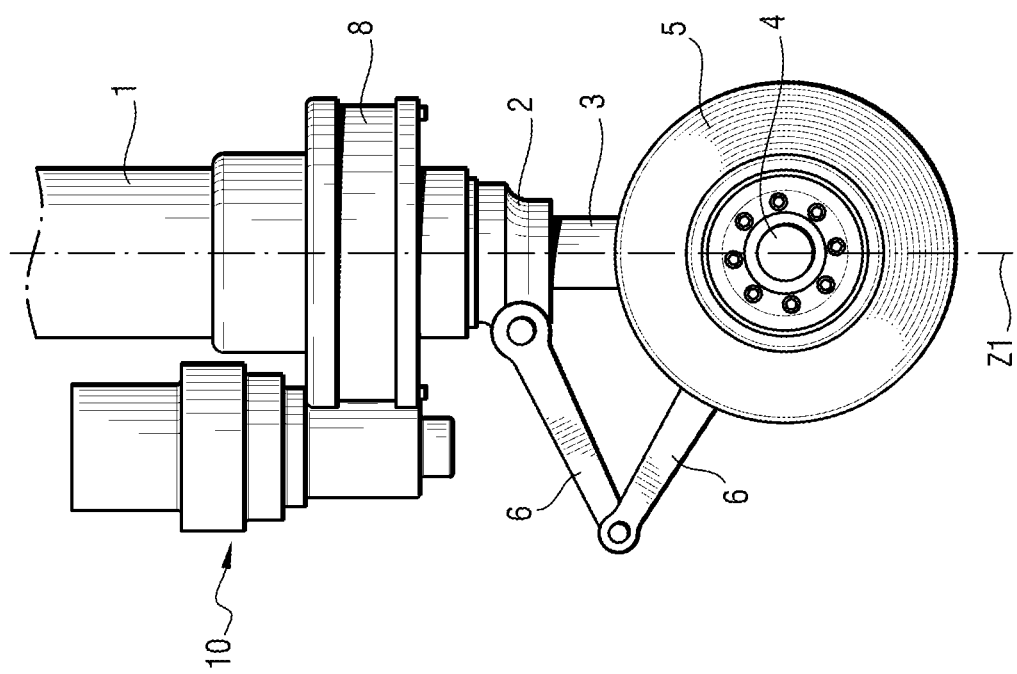
FIG. 1 is a diagrammatic view of the bottom of an undercarriage fitted with a steering device including a rotary lock of the invention.

With reference to FIGS. 1 and 2, and in particular embodiment of the invention, the undercarriage shown comprises a strut-leg 1 in which a turnable tube 2 is mounted to turn about a longitudinal axis Z1. A telescopic shock absorber 3 extends inside the turnable tube 2. The bottom portion of the shock absorber projects from the tube 2 and carries an axle 3 receiving wheels 5. A scissors linkage 7 extends between the turnable tube 2 and the shock absorber 3 in order to constrain the turnable tube 2 and the shock absorber 3 to turn together, while still allowing the shock absorber to move freely into the strut-leg 1 along the axis Z1. The turnable tube 2 carries a spur gear 7 (visible in FIG. 3) at its bottom end, which spur gear is received in a housing 8 of the strut-leg 1 and is constrained to turn together with the turnable tube 2 by fluting 9.

The undercarriage is fitted with a steering device having an electromechanical steering actuator 10 adapted to co-operate with the spur gear 7 in order to turn the tube 2, and thus the wheels 5, by means of the scissors linkage 6.

Figure 3:
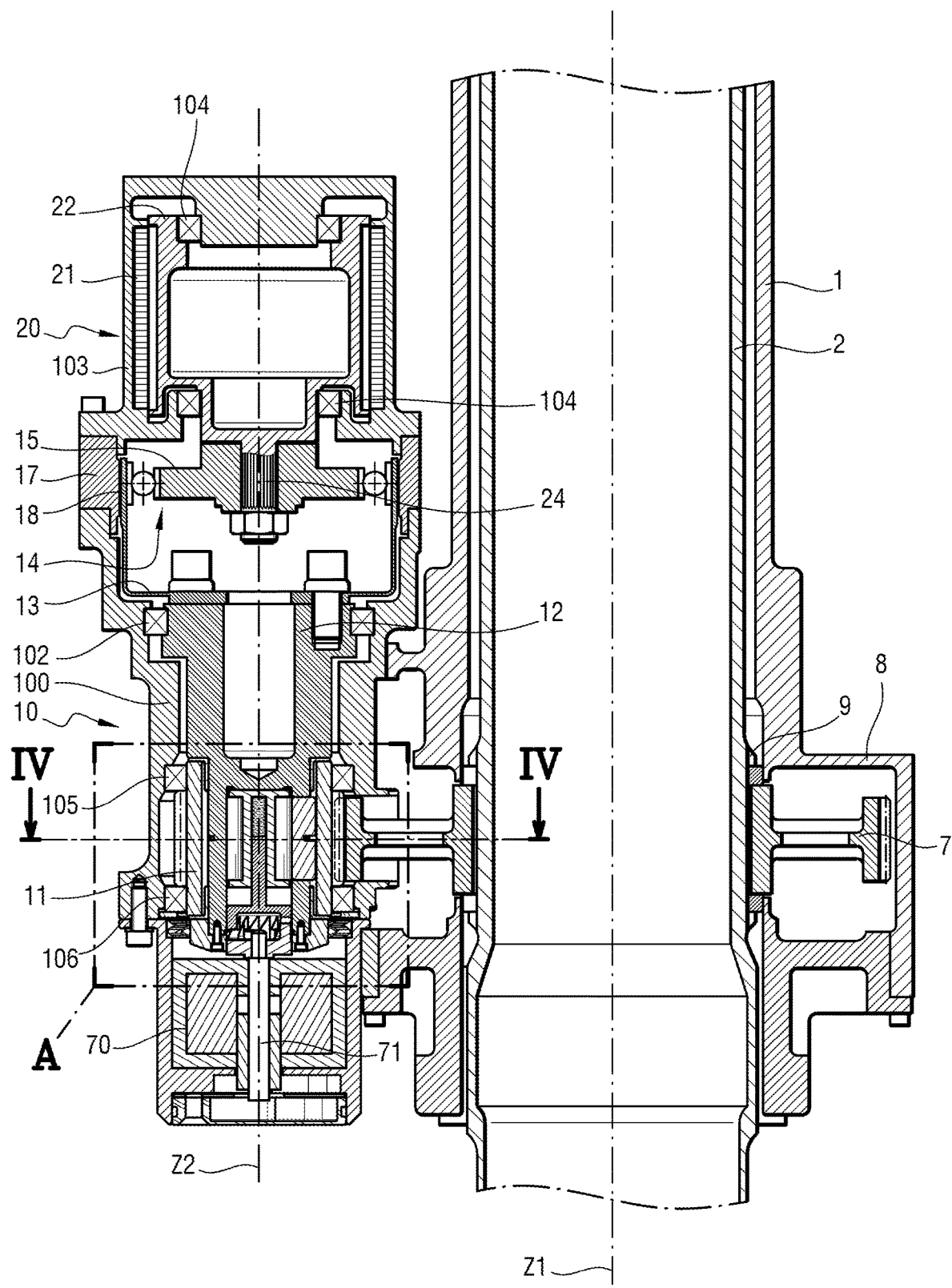
FIG. 3 is a view of the electromechanical steering actuator in section on line III-III of FIG. 2.
Figure 3A:
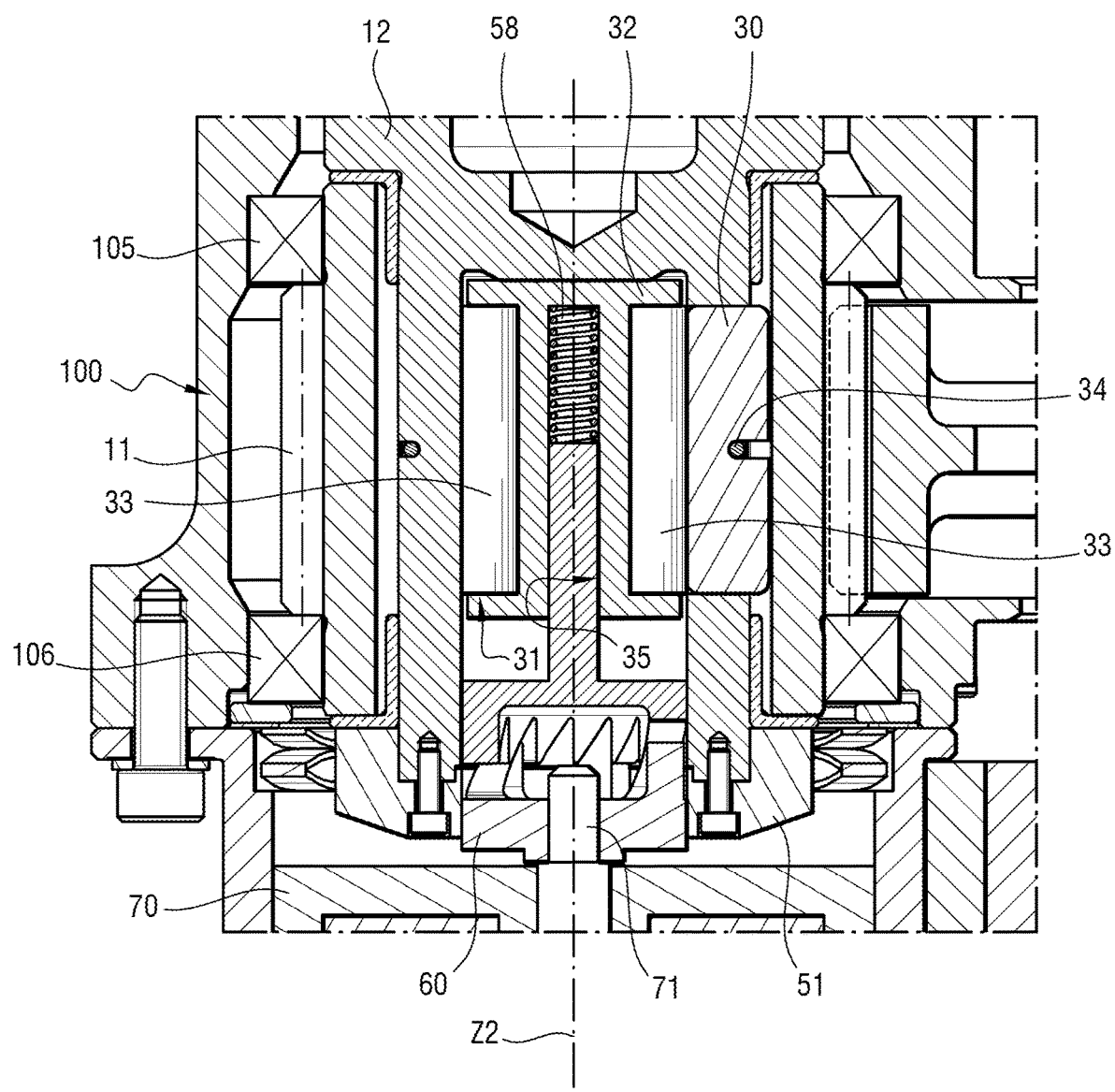
FIG. 3A is an enlarged view of detail A of FIG. 3.

With reference to FIG. 3, the spur gear 7 is engaged by an outlet pinion 11 of the electromechanical steering actuator 10, which is mounted thereon so as to be rotatable about an axis Z2 parallel to the axis Z1 of the undercarriage in casing 100 of the actuator 10 by means of rolling bearings 105 and 106. The pinion 11 is driven selectively in rotation by a shaft or spindle 12 rotatably mounted in the casing 100 of the actuator 10 by means of a rolling bearing 102. The selective connection between the pinion 11 and the spindle 12, which constitutes the subject matter of the invention, is explained in greater detail below.

The spindle 12 is secured to the outlet member 13 of reduction gearing 14 of the "harmonic drive" type as described in particular in Document U.S. Pat. No. 2,906,143. The outlet member 13 has a circular wall 18 in the form of a deformable bell that carries on its outside face teeth for co-operating with a slightly greater number of facing teeth of a ring gear 17 secured to the casing 100. Co-operation between the teeth of the outlet member 13 and of the ring gear 17 is made possible by the circular wall 18 being deformed by an inlet member 15 of the reduction gearing (referred to as a "wave generator"), that forces co-operation between the teeth in two diametrically opposite portions. It should be observed that in this example the ring gear 17 forms a portion of the casing of the electromechanical steering actuator.

The inlet member 15 of the reduction gearing 14 is driven in rotation by an electric motor 20 comprising a stator 21 carried by a portion 103 of the casing 100 secured to the ring gear 17, and a rotor 22 rotatably mounted in the casing portion 103 by means of rolling bearings 104. The rotor 22 has a fluted outlet shaft 24 engaged in a matching fluted orifice of the inlet member 15 in order to drive it in rotation. Controlled rotation of the rotor 22 causes the pinion 11 to rotate via the reduction gearing 14, and thereby turns the spur gear 7 and thus steers the wheels 5.

With reference to FIGS. 3A, 4, 5, and 6 there follows a detailed description of the core of the invention, namely the selective connection between the spindle 12 and the pinion 11.

The pinion 11 can be locked in rotation on the spindle 12 in order to enable it to be driven by the motor 20, or on the contrary it can be released in rotation, e.g. in order to enable the wheels of the undercarriage to swivel freely in the event of the motor 20 becoming blocked. To do this, and as can be seen more clearly in FIGS. 4 and 5, the spindle 12 includes radial slots that receive obstacles, specifically blades 30 mounted to move radially in the spindle 12 between a projecting position shown in FIG. 4 in which pointed ends of the blades 30 penetrate into matching receptacles in the pinion 11 in order to lock the pinion 11 to rotate with the spindle 12, and a retracted position shown in FIG. 5 in which the blades 30 do not project beyond the outer wall of the spindle 12 and allow the pinion 11 to rotate freely on the spindle 12. The blades are urged towards the retracted position by a resilient ring 34, which can be seen in FIG. 3A.

Figure 4:
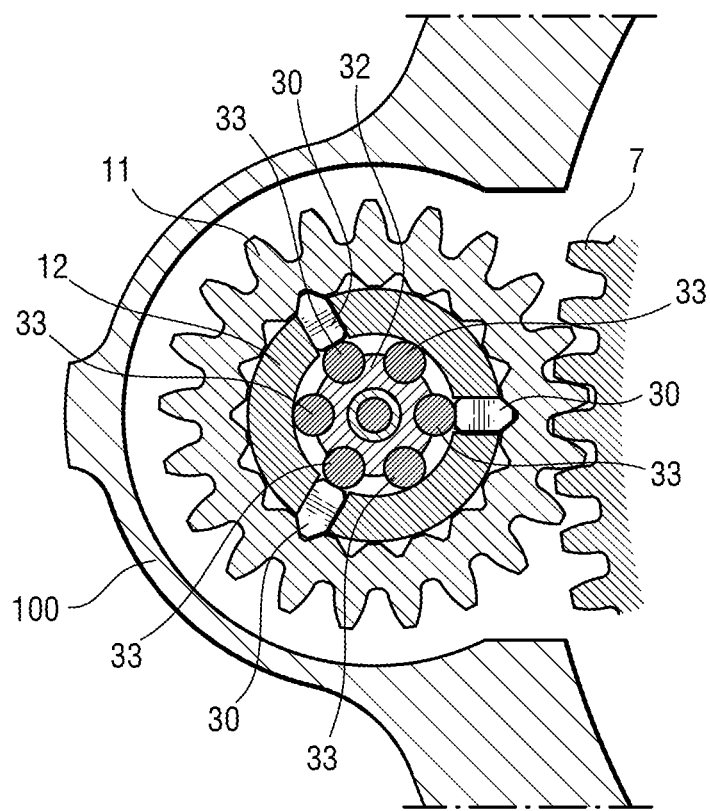
FIGS. 4 and 5 are section views on line IV-IV of FIG. 3 through the rotary lock, shown respectively in the locking position and in the release position.
Figure 5:
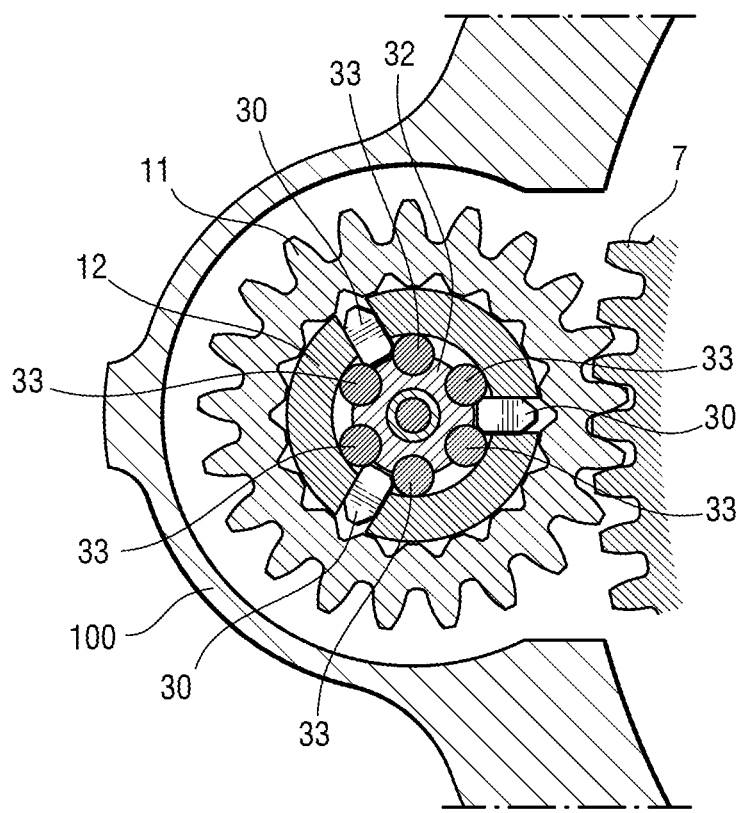

A rotary lock 31, in this example in the form of a bushing 32 carrying a plurality of parallel rollers 33, is rotatably mounted inside the spindle 12, coaxially therewith, so as to present successive angular positions including locking positions in each of which some of the rollers 33 are directly in register with the blades 30 in order to hold them in a projecting position and prevent them from retracting, as shown in FIG. 4, and alternating release positions in which the rollers 33 are offset from the blades 30 so that the blades can retract into recesses in the bushing between pairs of rollers 33, as shown in FIG. 5.

Figure 6:
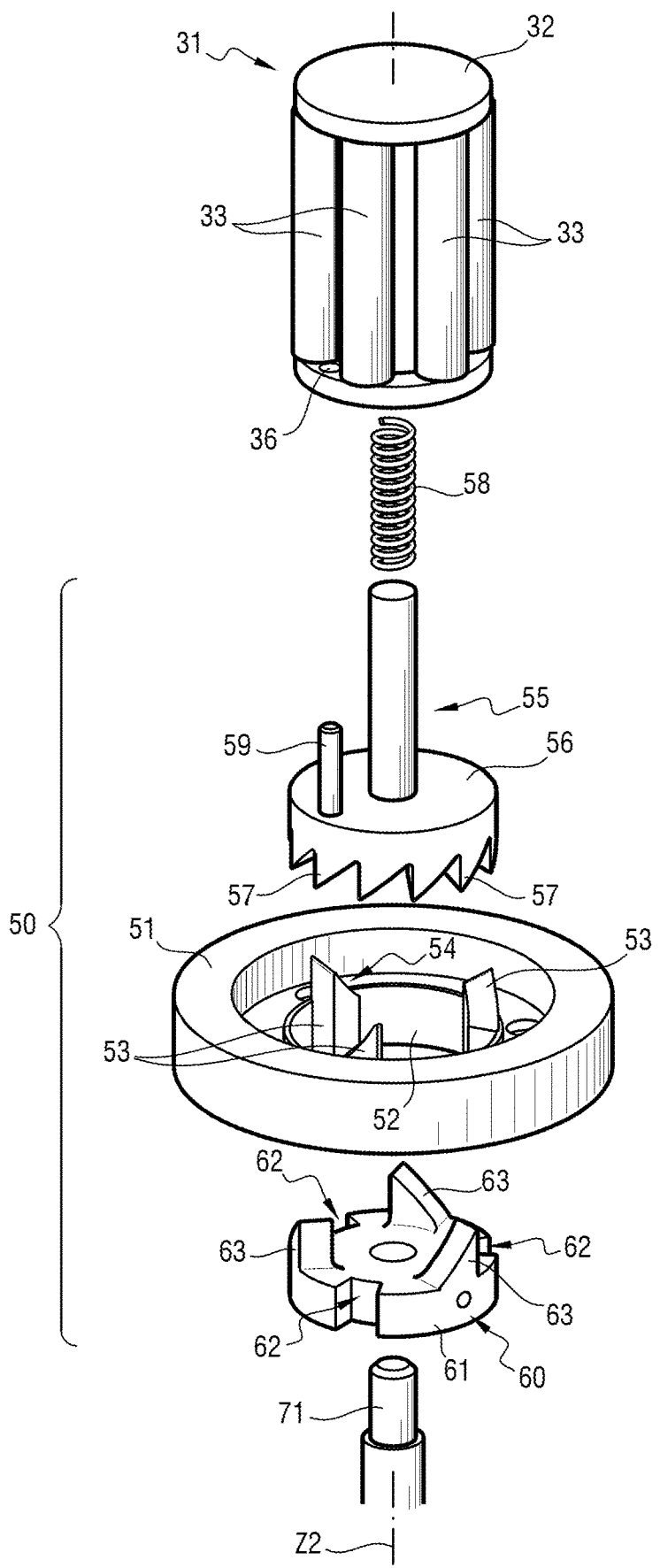
FIG. 6 is an exploded view of the angular indexing mechanism and of the rotary lock.
Figure 7:
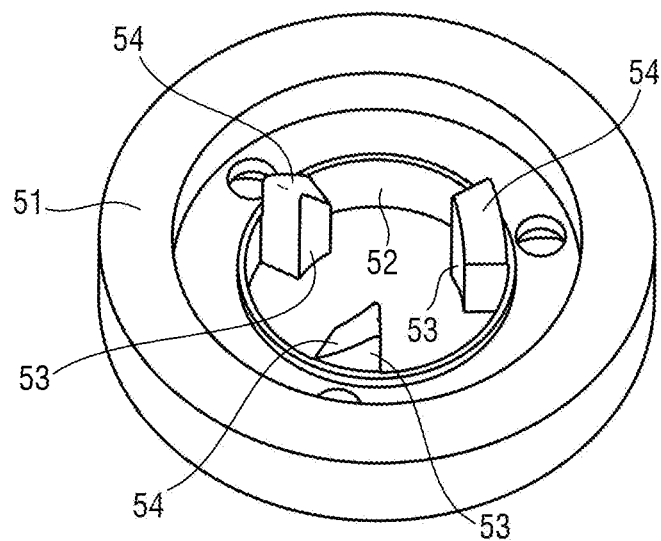
FIGS. 7, 8, and 9 are perspective views of parts of the angular indexing mechanism of FIG. 6.
Figure 8:
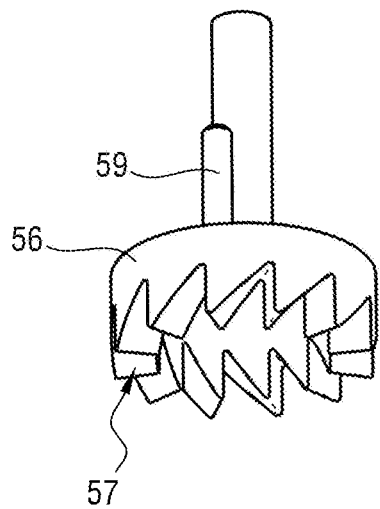
Figure 9:
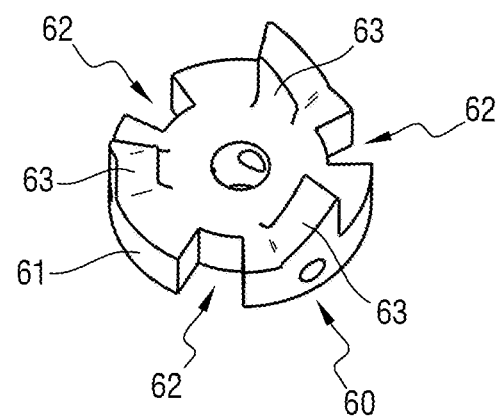

The rotary lock 31 is turned from one position to the next by means of an angular indexing mechanism 50 that is shown in detail in FIG. 6 and that comprises the following elements, all centered on the axis Z2:

- a ring 51, shown in detail in FIG. 7, fitted on the bottom end of the spindle 12. The ring 51 defines a bore 52 from which three parallel guides 53 project internally, which guides are terminated by slopes 54;
- a selector 55, as shown in detail in FIG. 8, comprising a bell 56 having its terminal edge cut to present successive slopes 57. The bell 56 is secured to a rod that is received in operation in a central well 35 in the bushing 32 in order to provide the selector 55 with axial and rotary guidance relative to the axis Z2. Also, the selector 55 includes a finger 59 that is received in an orifice 36 in the base of the bushing 32 in order to constrain the selector 55 and the bushing 32 to move together in rotation, while allowing the selector 55 to move axially;
- a return spring 58 received in the central well 35 of the bushing 32 in order to push the selector 55 towards the ring 51 so that the slopes 57 of the selector come to bear against the slopes 54 of the guides 53 of the ring 51; and finally
- a pusher 60, as shown in detail in FIG. 9, mounted at the end of a finger 71 of an electromagnet 70 arranged in the bottom portion of the casing 100 to be moved axially along the axis Z2 while pushing back the selector 55 against the spring 58. The pusher 60 includes a circular outer surface that co-operates with the bore 52 of the ring 51 in order to guide it axially. The pusher 60 has three notches 62 for receiving the guides 53 of the ring 51 so as to constrain the pusher 60 and the ring 51 to move together in rotation while allowing the pusher 60 to move axially. The pusher 60 also has three slopes 63 that extend in register with the slopes 57 of the selector 55.

The assembly comprising the electromagnet 70, the angular indexing mechanism 50, and the rotary lock 32 forms the pulse-controlled locking device of the invention. It operates as follows. While the electromagnet 70 is not powered, the pusher 60 is disengaged slightly from the slopes 57 of the selector 55, which rest against the ends of the guides 54, thereby defining an angular position for the selector 55, and thus an angular position for the rotary lock 32 (e.g. the locking position). In order to cause the rotary lock 33 to pass to its other position (specifically the release position), it suffices to power the electromagnet 70 briefly so that the finger 71 pushes the pusher 60 and thus pushes the selector 55 against the spring 58. When the slopes 57 of the selector are completely disengaged from the slopes 54 of the guides 53 of the ring 51, the slopes 57 of the selector slide on the slopes 63 of the pusher 60, thereby causing the selector 55 to turn. When the electromagnet 70 is no longer powered, the finger 71 retracts and the spring 58 pushes the selector 55 back towards the ring 51 so that the selector 55 comes to rest against the guides 53, the tips of the guides 53 being received in the recesses between the slopes 57 of the selector 55, thereby defining a new angular position that corresponds to the release position of the rotary lock 32.

The operation of the angular indexing mechanism 50 resembles the operation of a so-called "click pen" mechanism for a pen having a retractable tip, except in that the selector 55 of the angular indexing mechanism of the invention does not have two distinct axial positions, and instead use is made herein of the successive angular positions of the selector 55.

A single electric pulse thus serves to actuate the lock by means of the electromagnet 70. It should be observed that the ring 51 is secured to the spindle 12 and therefore turns together therewith, and also with the pusher 60, since it is indexed in turning on the ring 51. In contrast, the electromagnet 70 is secured to the casing 100 and is thus stationary.

The invention is not limited to the above description, but on the contrary covers any variant coming within the ambit defined by the claims. In particular, although the above description relates to a configuration in which the selector of the angular indexing mechanism is coaxial with the rotary lock, the angular indexing mechanism could be arranged relative to an axis other than the axis of rotation of the rotary lock, e.g. an axis parallel therewith, providing a rotary connection is ensured between the selector and the rotary lock.

Although the invention is described above in an application to locking rotation of a pinion on a spindle or shaft, the invention applies more generally to any type of locking between two elements that can move relative to each other, whether in rotation or in translation. For example, the invention is entirely suitable for application to locking two elements that are slidable relative to each other using catch locking means fitted with a rotary locking sleeve, as described in Document FR 2 952 414. It suffices for the rotary locking sleeve to be constrained to rotate with rotation of the selector of the angular indexing mechanism of the invention.

The invention claimed is:

1. A locking device for preventing movement between two elements that are mounted to move relative to each other, the locking device comprising a lock, an angular indexing mechanism, a pulse-controlled actuator and a spring member, the lock being mounted to rotate relative to one of the two elements around an axis in order to present successive angular positions for locking and for release in which the lock alternates between preventing and allowing relative movement between the two elements, the lock being constrained to rotate around the axis with a selector of the angular indexing mechanism actuated by the pulse-controlled actuator arranged to push the selector against the spring member in order to cause said selector to turn around the axis on each pulse and thereby cause the lock to pass from one angular position to the other without generating any translation of said lock along the axis.

2. A locking device according to claim 1, wherein the angular indexing mechanism comprises, centered on a central axis:
   a ring that defines a bore from which parallel guides project inwards, the parallel guides being terminated by slopes;
   the selector comprising a bell with a free edge of its wall being cut to present successive slopes, the selector being movable both in rotation and in translation and including means for constraining the selector to rotate with the lock, a return spring being arranged to push the selector back towards the ring so that the slopes of the selector come to bear against the slopes of the parallel guides of the ring; and
   a pusher arranged to be moved axially by the pulse-controlled actuator thereby pushing the selector back against the spring member, the pusher having a circular outside surface that co-operates with the bore of the ring in order to guide the pusher axially, together with notches to receive the parallel guides of the ring so as to constrain the pusher and the ring in rotation, while allowing the pusher to move axially, the pusher presenting slopes that extend in register with the slopes of the selector.

3. The locking device according to claim 1, wherein the lock and the selector are coaxial.

4. An assembly comprising two coaxial rotary elements including a shaft and a pinion mounted to rotate freely, and provided with a locking device according to claim 1, the shaft including at least one obstacle mounted to slide radially between a retracted position in which the pinion can turn freely on the shaft, and a projecting position in which the at least one obstacle blocks the pinion on the shaft, the lock comprising a bushing rotatably mounted coaxially inside the shaft in register with the at least one obstacle and presenting a release position in which the at least one obstacle is received in a recess in the bushing in order to be retracted, and a locking position into which the at least one obstacle is pushed by the bushing so as to be held in the projecting position.

* * * * *